(12) United States Patent
Wei

(10) Patent No.: US 6,866,219 B2
(45) Date of Patent: Mar. 15, 2005

(54) WIRE COLLECTING DEVICE

(76) Inventor: Jose Wei, No. 17-2, Pai Ling 1$^{st}$ Rd., Hsin Tien City, Taipei Hsien (TW)

( * ) Notice: Subject to any disclaimer, the term of this patent is extended or adjusted under 35 U.S.C. 154(b) by 81 days.

(21) Appl. No.: 10/460,723

(22) Filed: Jun. 13, 2003

(65) Prior Publication Data

US 2004/0200920 A1 Oct. 14, 2004

(30) Foreign Application Priority Data

Apr. 11, 2003 (TW) ........................ 92205742 U

(51) Int. Cl.$^7$ ............................................. B65H 75/48
(52) U.S. Cl. ................................ 242/378.4; 242/385.1; 242/378.1; 191/12.4
(58) Field of Search .............................. 242/378, 378.1, 242/378.4, 385.1; 191/12.4; 439/501

(56) References Cited

U.S. PATENT DOCUMENTS

| | | | | |
|---|---|---|---|---|
| 1,451,300 A | * | 4/1923 | Helman | 242/378.4 |
| 5,706,353 A | * | 1/1998 | Arai et al. | |
| 6,059,213 A | * | 5/2000 | Phillips | 242/378.4 |
| 6,254,025 B1 | * | 7/2001 | Liao | 242/378.1 |
| 6,371,398 B1 | * | 4/2002 | Liao | 242/378.1 |
| 6,405,961 B1 | * | 6/2002 | Mastrangelo | 242/378.1 |
| 6,416,005 B1 | * | 7/2002 | Liao | 242/378.1 |
| 6,434,249 B1 | * | 8/2002 | Wei | |
| 6,658,130 B2 | * | 12/2003 | Huang | |

* cited by examiner

Primary Examiner—William A. Rivera
(74) Attorney, Agent, or Firm—Dennison, Schultz, Dougherty & MacDonald

(57) ABSTRACT

A wire collecting device includes at least two independent main wheel bodies provided with a side recesses at side walls thereof, respectively, large turning wheels having a larger diameter, respectively, and small turning wheels having a smaller diameter, respectively, wherein each pair of large and small turning wheels have a same center opening, respectively; large and small wire storage grooves formed at wheel breadths of the large and small turning wheels; and independent immovable axes flexibly connected into the center openings of the main wheel bodies, respectively. According to the aforesaid structure, a wire is winded and stored in the large and small wire storage wheels, respectively, and are distinguished as at least two A and B wires and at least two C and D wires being stored in the large and small wire storage grooves, thereby selectively and independently releasing at least two wires with predetermined lengths.

7 Claims, 8 Drawing Sheets

WIRE COLLECTING DEVICE

BACKGROUND OF THE INVENTION (a) Field of the Invention

The invention relates to a wire collecting device, and more particularly, to a wire collecting device capable of selectively extracting wires having various lengths.

(b) Description of the Prior Art

Referring to the inventor's prior invention disclosed in the U.S. Pat. No. 6,434,249B1, Earphone Wire Winding Box with Coaxial and Dual Wheels, two coaxial turning wheels therein are flexibly connected to a single axis portion through a same center opening, and a wire is winded and stored in storage grooves at the large and small turning wheels. Through designs in which large and small turning wheels have different ratios of diameters thereof, an upper wire thereof being released is comparatively longer whereas a lower wire thereof being released is quite short.

However, the aforesaid example is limited to releasing a single wire. Suppose the number of the upper wire is two as in common earphones, the prior invention then becomes inapplicable. Hence, it is a vital task of the invention as how to make advancement over the prior wire collecting device, such that the wire collecting device is able to independently release more than one wire having same or different lengths.

SUMMARY OF THE INVENTION

Therefore, the primary object of the invention is to provide a wire collecting device comprising a plurality of main wheel bodies formed by large and small turning wheels, and flexibly connected independent axes, respectively, thereby selectively and independently releasing at least two wires with predetermined lengths.

DETAILED DESCRIPTION OF THE PREFERRED EMBODIMENTS

To better understand the invention, detailed descriptions shall be given with the accompanying drawings hereunder.

Figure 1:
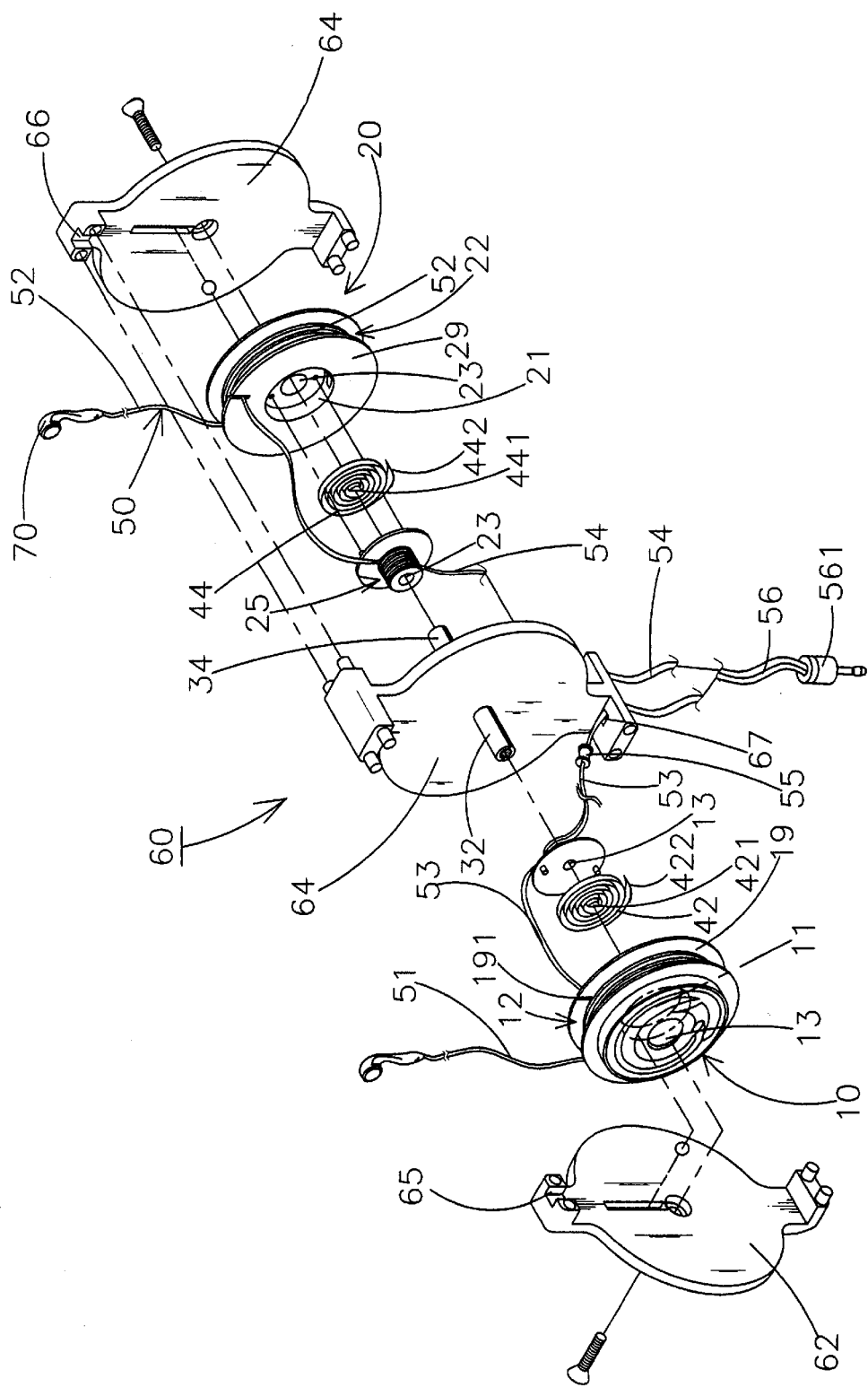
FIG. 1 shows an exploded elevational view of an embodiment according to the invention.
Figure 2:
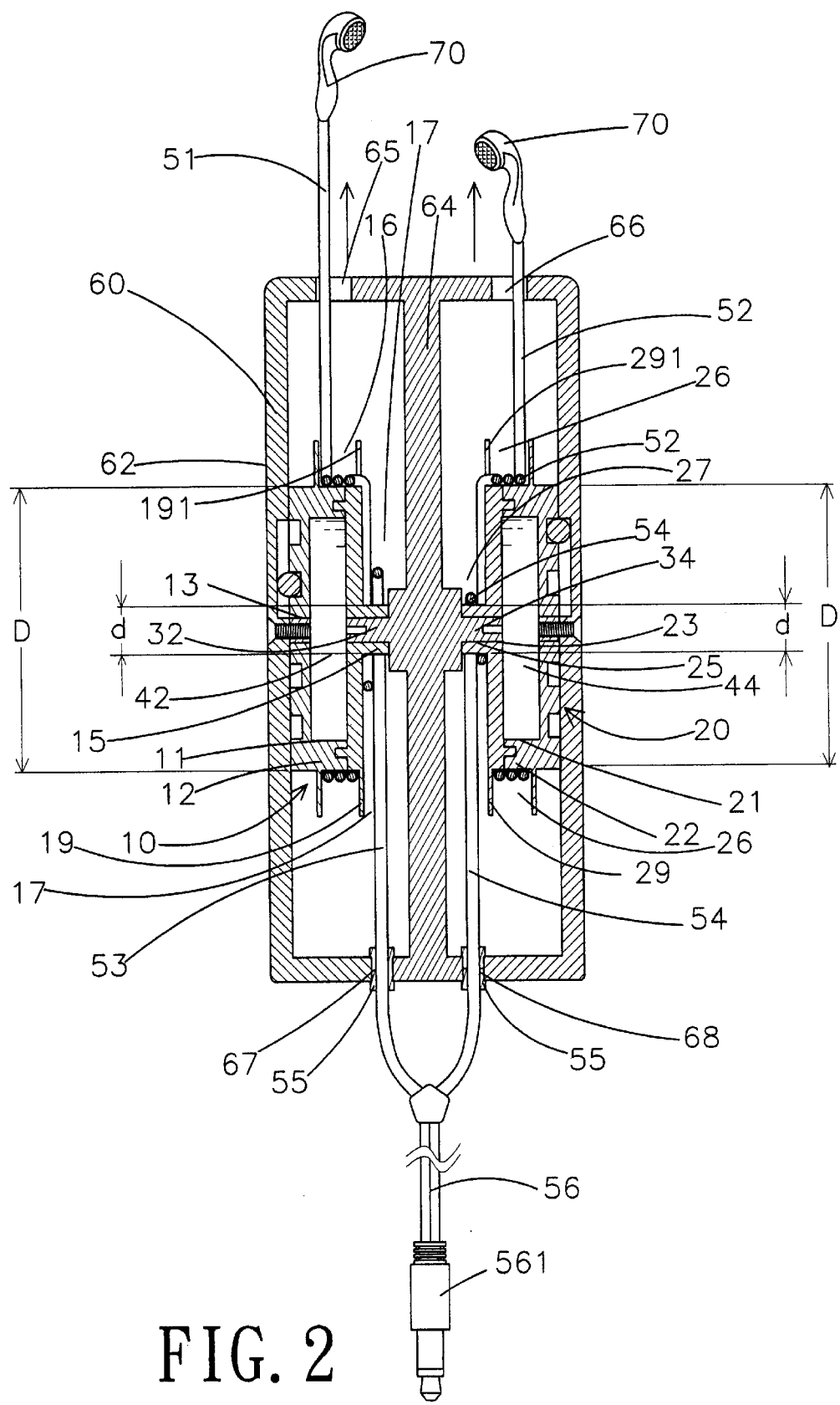
FIG. 2 shows a sectional view according the invention releasing wires.

Referring to FIGS. 1 and 2, the invention comprises the characteristics of:

at least two independent main wheel bodies 10 and 20 provided with side recesses 11 and 21 at side walls thereof, large turning wheels 12 and 22 having a larger diameter, and small turning wheels 15 and 25 having a smaller diameter, wherein each pair of large and small turning wheels, 12 and 15, 22 and 25 has same center openings 13 and 23, respectively; large and small wire storage grooves 16, 26, 17 and 27 formed at wheel breadths of the large and small turning wheels 12, 22, 15 and 25, respectively;

independent immovable axes 32 and 34 flexibly connected into the center openings 13 and 23 of the main wheel bodies 10 and 20, respectively;

a plurality of springs 42 and 44 placed in the side recesses 11 and 21, respectively, wherein inner terminals 421 and 441 are fixed to the immovable axes 32 and 34, respectively, whereas outer ends 422 and 442 are fixed to side walls of the side recesses 11 and 21, respectively; and a wire 50 winded and stored in the large and small wire storage grooves 16 and 17, 26 and 27, and distinguished as at least two A and B wires 51 and 52, and at least two wires C and D wires 53 and 54, wherein when the A wire 51 or the B wire 52 stored in the large wire storage grooves 16 and 26 is selectively and independently released with a greater length, a length of the C wire 53 or the D wire 54 released from the small wire storage grooves 17 and 27 is extremely small.

According to the aforesaid primary characteristics, wherein the plurality of immovable axes 32 and 34 are fixed in an inner accommodating room 61 of a single housing 60. The housing 60 is consisted of a left housing 62, a right housing 63 and a middle partition 64. The middle partition 64 is for separating the plurality of immovable axes 32 and 34. The housing 60 is further formed with a plurality of upper guiding orifices 65 and 66 at a top portion thereof, and a plurality of lower guiding orifices 67 and 68 at a bottom portion thereof, such that A and B wires 51 and 52 are guided to an exterior of the housing 60 via the upper guiding orifices 65 and 66, and the C and D wires 53 and 54 are guided to the exterior via the lower guiding orifices 67 and 68.

Figure 7:
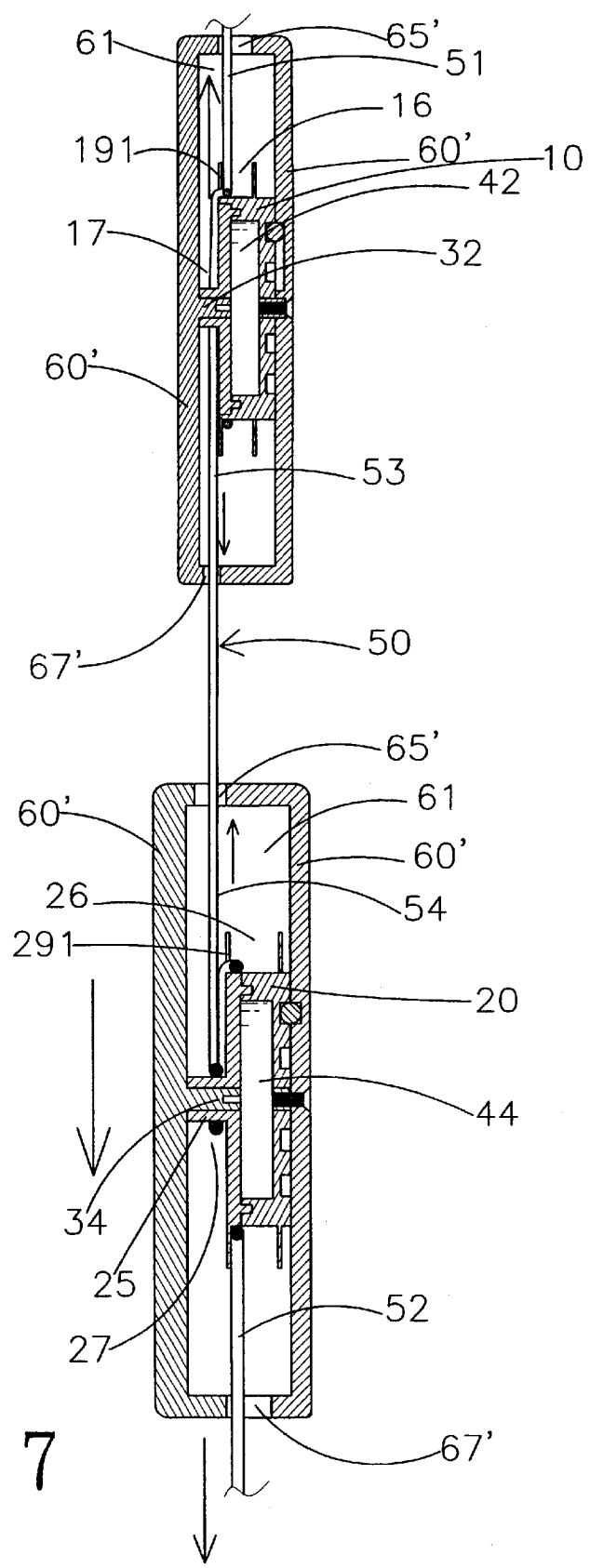
FIG. 7 shows another sectional view of another embodiment according to the invention.

According to the aforesaid primary characteristics and referring to FIG. 7, wherein each of at least two independent immovable axes 32 and 34 is fixed in an internal accommodating room 61 in each of independent housings 60'. Each of the adjacent housings 60' is disposed in a longitudinal arrangement, and each of the housings 60' is provided with an upper guiding orifice 65' at a top portion thereof and a lower guiding orifice 67' at a bottom portion thereof. The C and D wires 53 and 54 in the accommodating rooms 61 of the adjacent housings 60' are penetrated through the corresponding upper guiding orifice 65' and lower guiding orifice 67', thereby forming a continuous wire 50 from the C and D wires 53 and 54.

According to the aforesaid primary characteristics, wherein the plurality of C and D wires 53 and 54 are accommodated using anti-slide sheaths 55 and positioned at the lower guiding orifices 67 and 68, thereby forming fixed ends as shown in FIG. 2.

Figure 3:
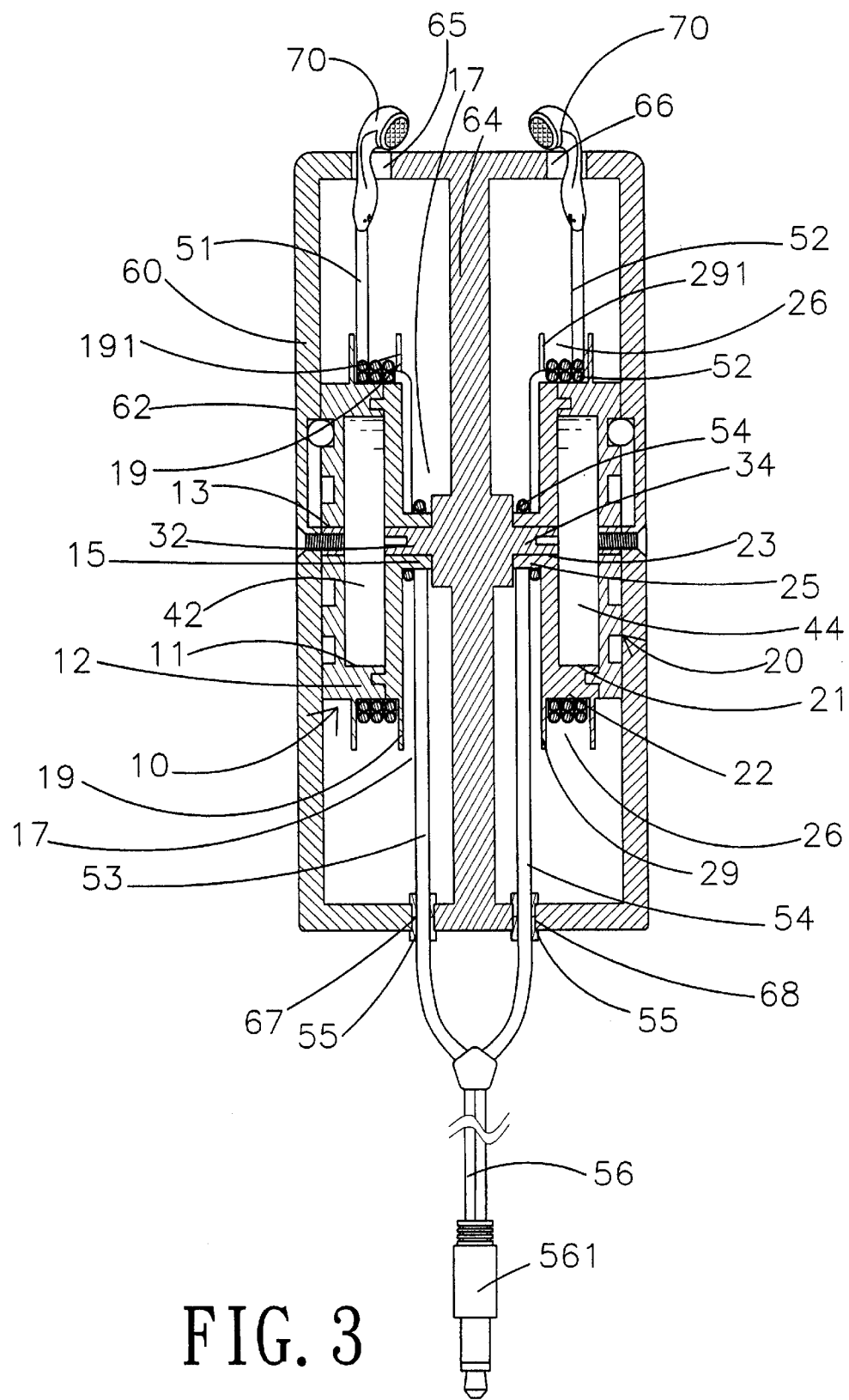
FIG. 3 shows a sectional view according to the invention winding wires.

According to the aforesaid primary characteristics, wherein the plurality of C and D wires 53 and 54 are merged as an independent lower wire 56 having an outer end thereof serving as a connector 561 for connecting to an electric appliance as shown in FIGS. 2 and 3.

According to the aforesaid primary characteristics, wherein the A and B wires 51 and 52 are guided to the exterior via the upper guiding orifices 65 and 66, thereby connecting outer ends of the A and B wires 51 and 52 to an earphone 70.

According to the aforesaid primary characteristics, wherein ring pieces 19 and 29 formed between the large and small turning wheels 12 and 22, 15 and 25 of the main wheel bodies 10 and 20, are provided with clamp notches 191 and 291 for wedging and fastening the wire 50, thereby preventing sliding and over-displacement between the A and B wires 51 and 52, and the C and D wires 53 and 54.

EXAMPLES

1. Referring to FIG. 1, an interior of the single housing 60 is disposed with at least two main wheel bodies 10 and 20. A user is able to select any wire from the A wire 51 and the B wire 52 for release.

Referring to FIG. 2, when the A wire 51 is extracted, the main wheel body 10 rotates regarding the independent immovable axis 32 as a rotation axis thereof due to torsion imposed by pulling the A wire 51 upward. At this moment, the other main wheel body 20 remains still. Hence, the large and small turning wheels 12 and 15 are rotated coaxially in a same direction; when the large turning wheel 12 rotates one revolution, the small turning wheel 15 rotates one revolution as well. For one revolution made by the large turning wheel 12, a length of the A wire 51 being released from (or winded into) the large wire storage groove 16 is $\pi \times D$, where D is the diameter of the large turning wheel. Similarly, for one revolution made by the small turning wheel 15, a length of the C wire 53 being released from (or winded into) the small wire storage groove 17 is $\pi \times d$, where d is the diameter of the small turning wheel 15.

Figure 4:
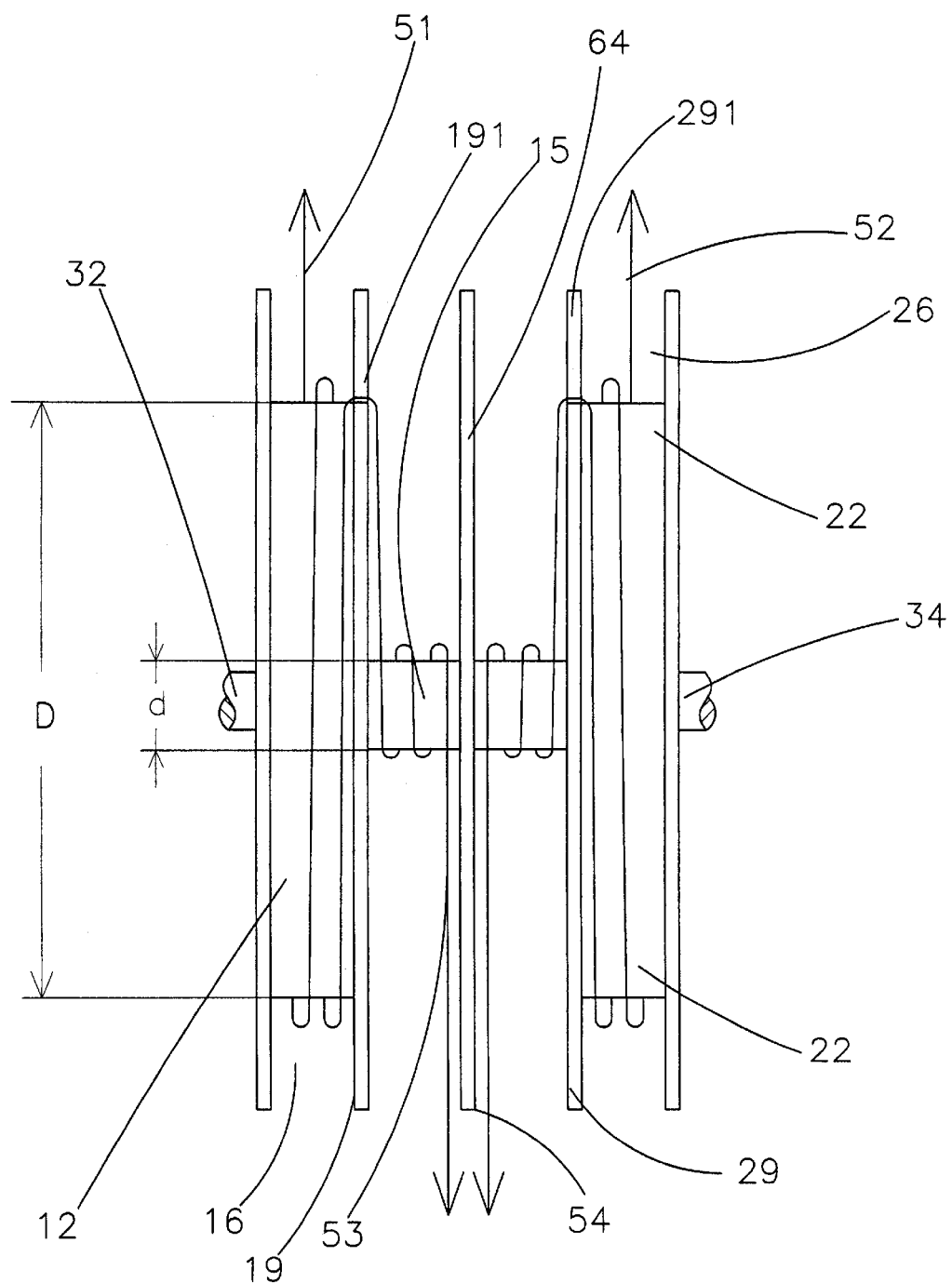
FIG. 4 shows a side schematic view illustrating motions of wire winding and releasing according to the invention.

Referring to FIGS. 2 and 4 showing the large and small turning wheels 12 and 15 rotating coaxially, the ratio of lengths of the wires released (or winded) equals to the ratio of diameters of the large and small turning wheels 12 and 15; that is, D:d. In a preferred embodiment of the invention, the ratio of diameters of the large and small turning wheels 12 and 15 is 10:1. Suppose the length of the A wire 51 being released is 50 cm, the C wire 53 released is 5 cm. At this point, a fixed end is formed at a location where the anti-slide sheath 55 positions the C wire 53, and therefore the length of 5 cm of the C wire 53 released shows a lax state in the small wire storage groove 17. As a result, the C wire 53 is not released out of the housing 60. Likewise, when the user extracts the B wire 52, the A wire 51 is unaffected. The other independent main wheel body 20 is impelled, the B wire 52 is independently released with a predetermined length, and the D wire 54 shows a lax state in the small wire storage groove 27. As a result, the D wire 54 is not released out of the housing 60. In addition, the wire 50 is wedged and fastened by the clamp notches 191 and 291, so sliding between the A wire 51 and the B wire 52, the C wire 53 and the D wire 54 is not incurred. The C and D wires 53 and 54 may be merged for forming another independent lower wire 56 having an outer end thereof serving as a connector 561 for connecting to various joints. Furthermore, the independent lower wire 56 is left unmoved when the A and B wires 51 and 52 are released for that the C and D wires 53 and 54 of the independent wire 56 are fastened by the anti-slide sheaths 55. Therefore, purposes of selectively releasing the A wire 51 or the B wire 52, and releasing the wires with same or different lengths are accomplished.

2. For wire winding:

Referring to FIG. 3, when pulling forces upon the A wire 51 or the B wire 52 are dismissed, the springs 42 and 44 are elastically contracted and restored such that the independent main wheel bodies 10 and 20 rotate in a reverse direction. The extended A wire 51 or the B wire 52 are winded back into the large wire storage grooves 16 and 26, and the lax C wire 53 and the D wire 54 are winded tightly back into the small wire storage grooves 17 and 27. At this point, the independent lower wire 56 is unmoved owing to positioning effects of the anti-slide sheaths 55 have on the C and D wires 53 and 54.

Figure 5:
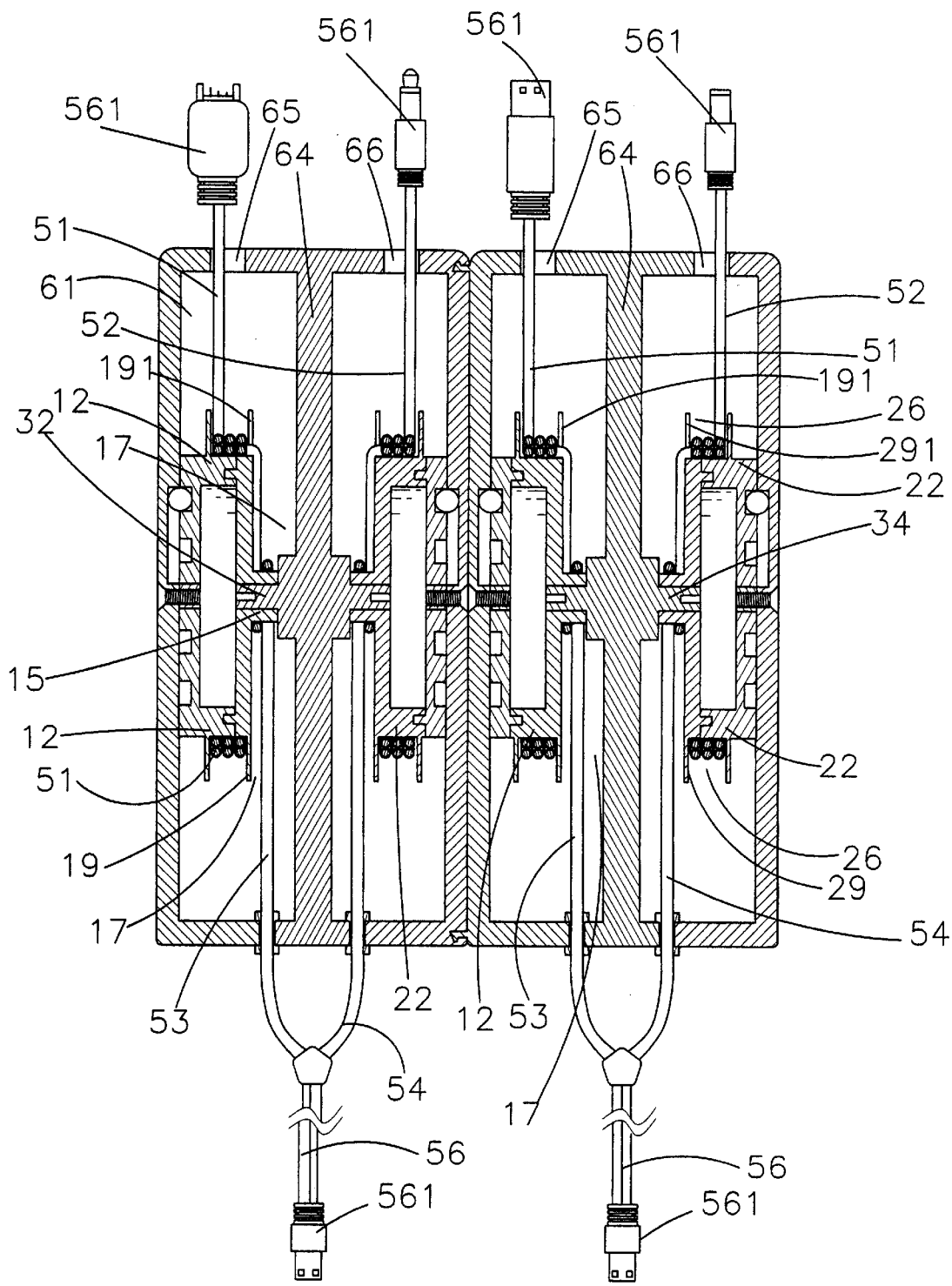
FIG. 5 shows a sectional view illustrating an embodiment having four main turning wheels according to the invention.
Figure 6:
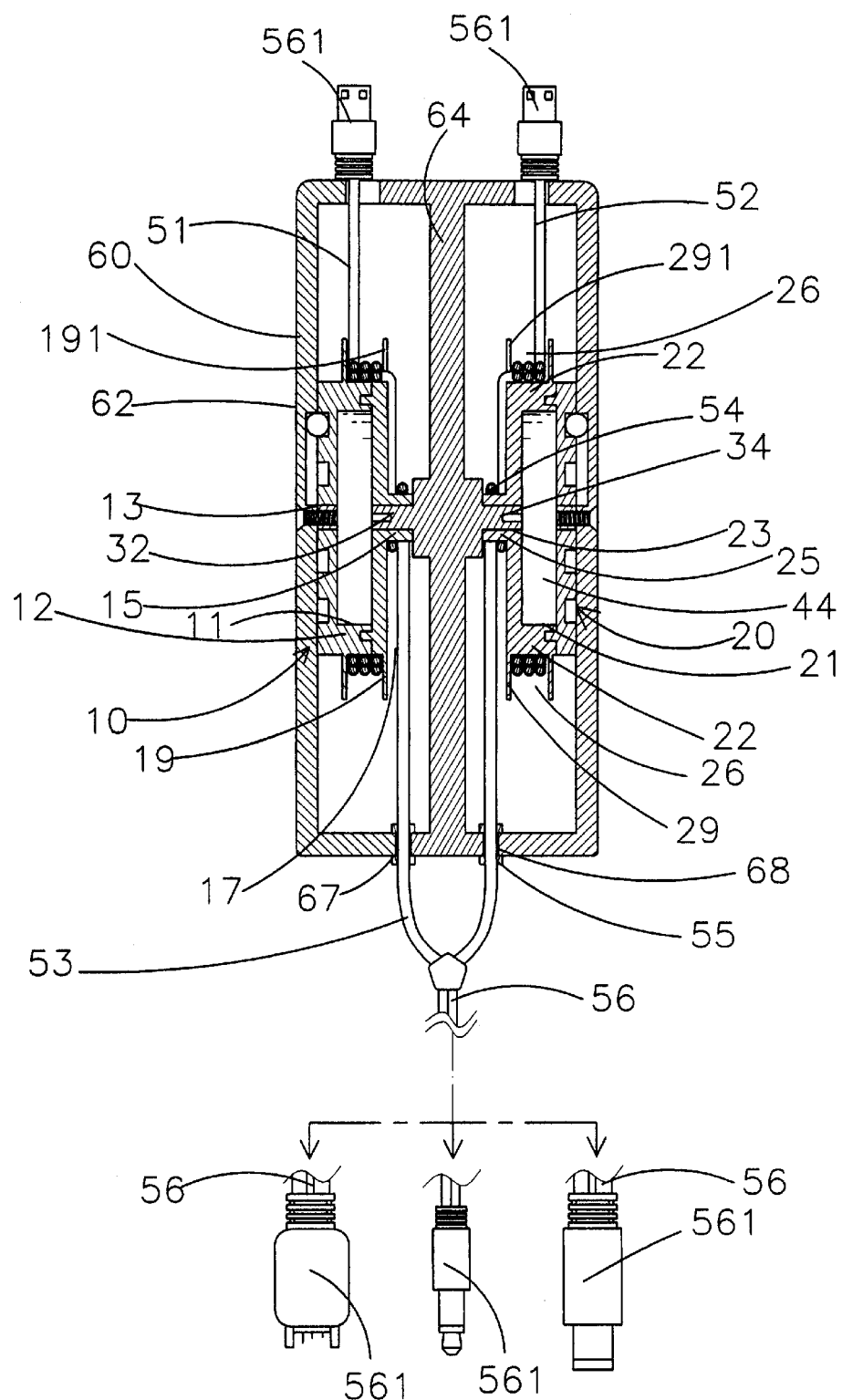
FIG. 6 shows a planar view illustrating the outer ends of the A and B wires connecting to various connectors according to the invention.

3. Referring to FIG. 5, the number of the main wheel bodies 10 and 20 may be implemented as four. The outer ends of the A and B wires 51 and 52 may then be connected to various connectors 561 for inserting into all kinds of electric appliances. Wherein, apart from connecting to various connectors 561, outer ends of the C and D wires 53 and 54 may also be connected to all kinds of electric appliances. Referring to FIGS. 6, the connectors 561 connected with the outer ends of the A and B wires 51 and 52 may be universal serial bus (USB) connectors, and connectors 561 connected with the outer ends of the C and D wires 53 and 54 may have various shapes and standards.

4. Referring to FIG. 7, at least two housings 60' are aligned and disposed in a longitudinal arrangement. The purpose of this example is to store a greater amount of the wire 50 as well as releasing a greater length of the wire 50.

When the A wire 51 is pulled out, the main wheel body 10 rotates regarding the immovable axis 32 as a rotation axis thereof, and the C wire 53 is released via the lower guiding orifice 67' with a smaller length. When the B wire 52 is pulled out, the main wheel body 20 rotates regarding the immovable axis 34 as a rotation axis thereof, and the D wire 54 is released via the upper guiding orifice 65' with a smaller length. As a result, the A, B, C and D wires 51, 52, 53 and 54 stored in the large and small wire storage grooves 16, 26, 17 and 27 of the two main wheel bodies 10 and 20 can be released out of the two housings 60 and 60' with great amounts, thereby also releasing the wire 50 with a greater length.

Figure 8:
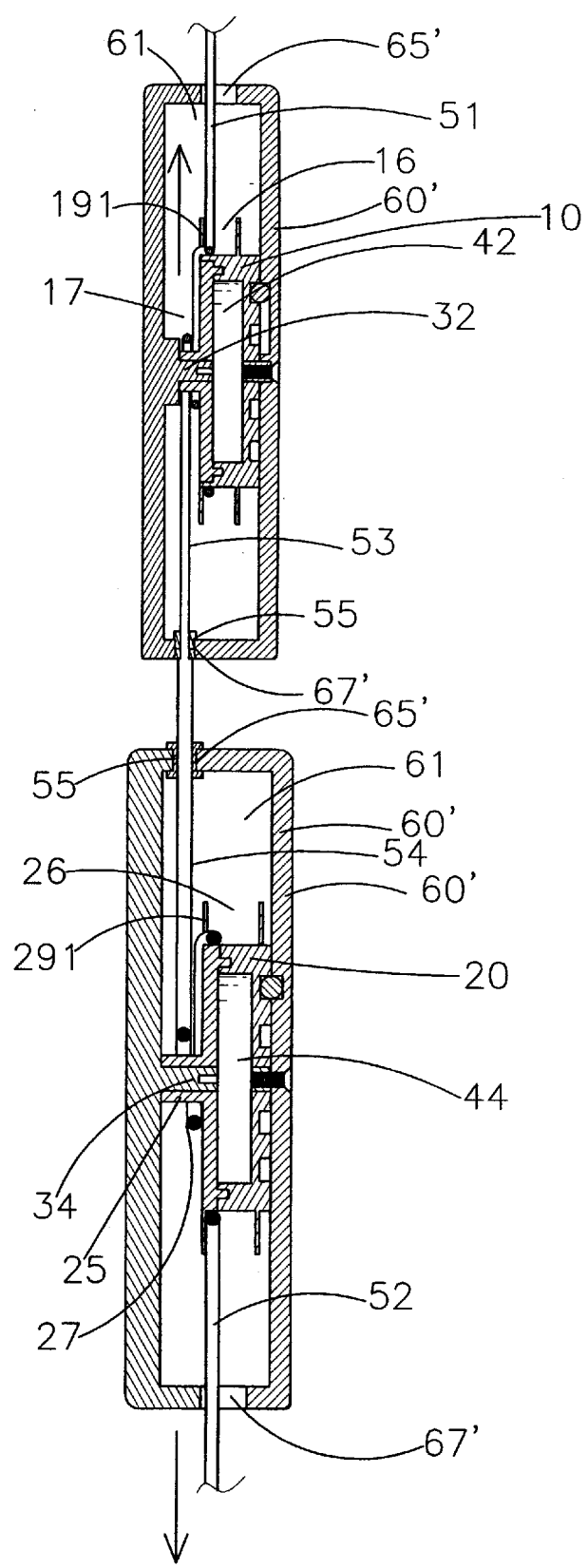
FIG. 8 shows a sectional view illustrating the guiding orifices in FIG. 7 being provided with anti-slide sheaths.

Referring to FIG. 8, the anti-slide sheaths 55 are accommodated in the upper guiding orifice 65' and the lower guiding orifice 67' and form a fixed end of C and D wires 53 and 54, respectively. When the A and B wires 51 and 52 are pulled out, the C and D wires 53 and 54 show a lax state in the small wire storage grooves 17 and 27, and are not released out of the two housings 60 and 60'.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A wire collecting device comprising:
   at least two independent main wheel bodies provided with a side recesses at side walls thereof, respectively, a large turning wheel having a larger diameter, respectively, and a small turning wheel having a smaller diameter, respectively, wherein each pair of large and small turning wheels have a same center opening, respectively;
   large and small wire storage grooves formed at wheel breadths of the large and small turning wheels;
   independent immovable axes flexibly connected into the center openings of the main wheel bodies, respectively;
   a plurality of springs placed in the side recesses, respectively, wherein inner terminals of the springs are fixed to the immovable axes, respectively, whereas outer ends thereof are fixed to side walls of the side recesses, respectively; and a wire wound and stored in the large and small wire storage grooves, and distinguished as at least two A and B wires, and at least two C and D wires, wherein when the A wire or the B wire stored in the large wire storage grooves is selectively and independently released with a greater length, a length of the C wire or the D wire released in the small wire storage grooves is extremely small.

2. The wire collecting device in accordance with claim 1, wherein the plurality of immovable axes are fixed in an inner accommodating room of a single housing; the housing is consisted of a left housing, a right housing and a middle partition; the middle partition is for separating the plurality of immovable axes; the housing is further formed with a plurality of upper guiding orifices at a top portion thereof, and a plurality of lower guiding orifices at a bottom portion thereof, such that A and B wires are guided to an exterior of the housing via the upper guiding orifices, and the C and D wires are guided to the exterior via the lower guiding orifices.

3. The wire collecting device in accordance with claim 1, wherein each of at least two independent immovable axes is fixed in an internal accommodating room in each of independent housings; each of the adjacent housings is disposed in a longitudinal arrangement, and each of the housings is provided with an upper guiding orifice at a top portion thereof and a lower guiding orifice at a bottom portion thereof; the C and D wires in the accommodating rooms in the adjacent housings are penetrated through the corresponding upper guiding orifice and lower guiding orifice, thereby forming a continuous wire from the C and D wires.

4. The wire collecting device in accordance with claim 1, wherein the plurality of C and D wires are accommodated using anti-slide sheaths and positioned at the lower guiding orifices, thereby forming fixed ends.

5. The wire collecting device in accordance with claim 1, wherein the plurality of C and D wires are merged as an independent lower wire having an outer end thereof serving as a connector to an electric appliance.

6. The wire collecting device in accordance with claim 1, wherein the A and B wires are guided to the exterior via the upper guiding orifices, thereby connecting outer ends of the A and B wires to an earphone.

7. The wire collecting device in accordance with claim 1, wherein a ring piece formed between the large and small turning wheels of the main wheel bodies, respectively, is provided with a clamp notch, respectively, for wedging and fastening the wire, thereby preventing sliding and over-displacement between the A and B wires, and the C and D wires.

* * * * *